(12) United States Patent
Chorvath et al.

(10) Patent No.: US 6,281,286 B1
(45) Date of Patent: Aug. 28, 2001

US006281286B1

(54) TOUGHENED THERMOPLASTIC RESINS

(75) Inventors: Igor Chorvath; Gerald Alphonse Gornowicz; David Joseph Romenesko; Jeffrey Paul Sage, all of Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/393,029

(22) Filed: Sep. 9, 1999

(51) Int. Cl.$^7$ .................................................. C08G 77/08
(52) U.S. Cl. ......................... 524/862; 524/791; 525/431; 525/446
(58) Field of Search .................................. 524/862, 791; 525/431, 446

(56) References Cited

U.S. PATENT DOCUMENTS

| | | | |
|---|---|---|---|
| Re. 33,070 | 9/1989 | Arkles | 525/431 |
| 3,627,836 | 12/1971 | Getson | 260/825 |
| 3,865,897 | 2/1975 | Falender | 260/827 |
| 3,969,308 | 7/1976 | Penneck | 260/37 SB |
| 4,500,688 | 2/1985 | Arkles | 525/431 |
| 4,695,602 | 9/1987 | Crosby | 524/439 |
| 4,714,739 | 12/1987 | Arkles | 525/92 |
| 4,775,712 | 10/1988 | Sasaki | 524/504 |
| 4,803,244 | 2/1989 | Umpleby | 525/105 |
| 4,831,071 | 5/1989 | Ward | 524/401 |
| 4,849,469 | 7/1989 | Crosby | 524/439 |
| 4,888,390 | 12/1989 | Liang | 525/189 |
| 4,970,263 | 11/1990 | Arkles | 525/92 |
| 5,051,478 | 9/1991 | Puydak | 525/195 |
| 5,391,594 | 2/1995 | Romenesko | 523/212 |
| 5,556,908 | 9/1996 | Chung | 524/493 |
| 5,604,288 | 2/1997 | Furukawa | 24/493 |
| 5,610,223 | 3/1997 | Mason | 524/504 |
| 5,629,938 | 5/1997 | Shore | 428/92 |
| 5,648,426 | 7/1997 | Zolotnitsky | 525/100 |
| 6,013,715 | * 1/2000 | Gornowicz et al. | 524/492 |
| 6,015,858 | * 1/2000 | Gornowicz | 524/545 |
| 6,153,691 | * 11/2000 | Gornowicz et al. | 524/861 |

FOREIGN PATENT DOCUMENTS

| | | |
|---|---|---|
| 279414 | 8/1988 | (EP) . |
| 410888 | 1/1991 | (EP) . |
| 506465 | 9/1992 | (EP) . |
| 651009 | 5/1995 | (EP) . |
| 62-11897 | 1/1987 | (JP) . |
| 62121752 | 6/1987 | (JP) . |
| 63-219147 | 9/1988 | (JP) . |
| 3-115450 | 5/1991 | (JP) . |
| 5-59287 | 3/1993 | (JP) . |
| 7-26147 | 1/1995 | (JP) . |
| 08337698 | 12/1996 | (JP) . |
| WO 96/01291 | 1/1996 | (WO) . |

* cited by examiner

*Primary Examiner*—Margaret G. Moore
(74) *Attorney, Agent, or Firm*—Alex Weitz; Jennifer S. Warren

(57) ABSTRACT

A thermoplastic composition having a high impact strength is disclosed, said composition being prepared by (I) mixing
 (A) a thermoplastic selected from a polyester resin or a polyamide resin,
 (B) a silicone component comprising
  (B') a diorganopolysiloxane gum having a plasticity of at least 30 and having an average of at least 2 alkenyl radicals in its molecule and
  (B") a fumed silica filler,
 (C) an organohydrido silicon compound which contains an average of at least 2 silicon-bonded hydrogen groups in its molecule, and
 (D) a hydrosilation catalyst, components (C) and (D) being present in an amount sufficient to cure said diorganopolysiloxane; and (II) dynamically curing said diorganopolysiloxane gum. When the above composition is based on preferred poly (butylene terephthalate) resins, molded components thereof exhibit an Izod impact strength of at least 14 ft-lb (747 J/m), this high impact strength also being realized by blending the poly(butylene terephthalate) resin with a polycarbonate resin, the fumed silica then being an optional component.

32 Claims, No Drawings

TOUGHENED THERMOPLASTIC RESINS

FIELD OF THE INVENTION

The present invention relates to a toughened thermoplastic resin composition. More particularly, the invention relates to a thermoplastic composition having a high impact strength which is prepared by dispersing a silicone polymer base in a thermoplastic resin and subsequently dynamically vulcanizing the silicone polymer therein.

BACKGROUND OF THE INVENTION

Thermoplastic vulcanizates (TPVs), wherein an elastomeric component is first dispersed in a thermoplastic resin and then dynamically vulcanized therein, are well known in the art. These compositions, which can be rigid plastics or elastomers depending upon concentration of the rubber phase, retain their thermoplastic nature and can be re-processed at elevated temperatures. This re-processability is a major advantage over chemically crosslinked rubbers and resins since it allows recycling of fabricated parts and results in a considerable reduction of scrap. Such systems often exhibit improved oil and solvent resistance and superior mechanical properties relative to corresponding simple blends wherein the elastomer is not cured. Over the last decade, a variety of TPVs has been disclosed wherein a silicone component is dispersed in an organic resin, such a system being referred to herein as a thermoplastic silicone vulcanizate (TPSiV).

For example, Arkles, in U.S. Pat. No. 4,500,688, discloses semi-interpenetrating networks (semi-IPNs) wherein a vinyl-containing, silicone fluid having, a viscosity of 500 to 100,000 cS is dispersed in a conventional thermoplastic resin. Arkles only illustrates these semi-IPNs at relatively low levels of silicone. The vinyl-containing, silicone is vulcanized in the thermoplastic during melt mixing according to a chain extension or crosslinking, mechanism which employs a silicon hydride-containing, silicone component. Typical thermoplastics mentioned include polyamides, polyurethanes, styrenics, polyacetals and polycarbonates. This disclosure is expanded by Arkles in U.S. Pat. No. 4,714,739 to include the use of hybrid silicones which contain unsaturated groups and are prepared by reacting a hydride-containing, silicone with an organic polymer having unsaturated functionality. Although Arkles discloses a silicone fluid content ranging from 1 to 40 weight percent (1 to 60% in the case of the '739 patent), there is no suggestion of any criticality as to these proportions. Further, although these disclosures illustrate the use of fillers in some compositions, there is no suggestion that such inclusion is critical to any particular property.

Crosby et al. in U.S. Pat. No. 4,695,602 teach composites wherein silicone semi-IPNs vulcanized via a hydrosilation reaction are dispersed in fiber-reinforced thermoplastic resins having, a high flexural modulus (>90,000 psi). The silicones employed are of the type taught by Arkles, cited supra, and the composites are said to exhibit improved shrinkage and warpage characteristics relative to systems which omit the IPN. Although various fillers such as mica, talc or clay are optionally included in the compositions, there is no suggestion that a particular filler or its content is critical to any desired result.

Ward et al., in U.S. Pat. No. 4,831,071, disclose a method for improving the melt integrity and strength of a high modulus thermoplastic resin to provide smooth-surfaced, high tolerance profiles when the modified resin is melt-drawn. As in the case of the disclosures to Arkles et al., cited supra, a silicone mixture is cured via a hydrosilation reaction after being dispersed in the resin to form a semi-IPN, after which the resulting composition is extruded and melt-drawn. This patent specifically illustrates the method for a poly (butylene terephthalate) (PBT) resin wherein 2 weight percent of the silicone IPN is used, although the nature of the silicone components is unclear.

Certain of the above described TPSiVs have also been found to exhibit improved impact resistance relative to unmodified polymers. For example, U.S. Pat. No. 5,648,426, Zolotnitsky describes a method for improving the impact resistance of thermoplastics wherein a mixture of silicone fluids curable by a hydrosilation reaction is dispersed in a first thermoplastic resin and the resulting blend is pelletized. In a second step, a hydrosilation catalyst is sprayed onto the pellets, which are then mixed with a second identical or different thermoplastic resin in a third step. The catalyst is activated in this third step to cure the silicone components and form a semi-interpenetrating network. Zolotnitsky states that any thermoplastic resin can be modified according to this method but only illustrates the use of polypropylene. Again, various fillers are mentioned as optional ingredients, but one of ordinary skill in the art is not directed to any particular system or concentration.

A copending application to Gornowicz et al. entitled "Thermoplastic Silicone Elastomers" (Ser. No. 09/034,089), also teaches the preparation of TPSiVs wherein silicone gum is dispersed in an organic resin and subsequently dynamically vulcanized therein via a hydrosilation cure system. Under certain conditions, systems based on polyolefin or poly(butylene terephthalate) (PBT) resins were shown to have significantly improved mechanical properties over the corresponding simple blends of resin and silicone gum in which the gum was not cured.

Although the above mentioned patents generally disclose thermoplastic silicone vulcanizate compositions, neither these references, nor any art known to applicants, teach the specific components and quantities thereof required to obtain silicone-modified thermoplastic resin systems having exceptional impact resistance, particularly PBT resins.

SUMMARY OF THE INVENTION

It has now been discovered that the impact resistance of thermoplastic resins, particularly polyamide resins and polyester resins such as poly(butylene terephthalate), can be greatly augmented by preparing a TPSiV therefrom wherein the elastomeric component is a silicone rubber base which comprises a silicone gum and a silica filler. Surprisingly, similar compositions containing low viscosity silicone fluids do not impart such a dramatic improvement. Moreover, the vast majority of this improvement is observed over a relatively narrow range of silicone content.

The present invention, therefore, relates to a thermoplastic composition prepared by
(I) mixing
(A) a thermoplastic selected from a polyester resin or a polyamide resin,
(B) a silicone component comprising
  (B') a diorganopolysiloxane gum having a plasticity of at least 30 and having an average of at least 2 alkenyl radicals in its molecule and
  (B") a fumed silica filler,
(C) an organohydrido silicon compound which contains an average of at least 2 silicon-bonded hydrogen groups in its molecule, and
(D) a hydrosilation catalyst, components (C) and (D) being present in an amount sufficient to cure said diorganopolysiloxane; and (II) dynamically curing said diorganopolysiloxane gum.

When the above composition is based on preferred PBT resins, molded components thereof exhibit an Izod impact strength of at least 14 ft-lb (747 J/m). Furthermore, such a high impact strength can also be achieved according to the invention by forming a TPSiV based on a blend of a poly(butylene terephthalate) resin and a polycarbonate resin, the fumed silica then being an optional component.

DETAILED DESCRIPTION OF THE INVENTION

Component (A) of the present invention may be a thermoplastic saturated polyester having a glass transition temperature above room temperature (i.e., 25° C.) and a crystalline melt temperature above 200° C. Examples include the above mentioned PBT, polyethylene terephthalate (PET), poly(1,4-cyclohexylenedimethylene terephthalate) (PCT), poly (trimethylene terephthalate) (PTT), and copolymers thereof, inter alia. In preferred embodiments of the present invention, component (A) comprises at least one poly (butylene terephthalate) resin. This PBT resin is a polymer or copolymer which is not crosslinked and, although it is a solid under normal ambient conditions, it readily flows upon the application of a shearing stress when heated above its melt point. The PBT resin is a polymer prepared by a condensation reaction between 1,4-butanediol and terephthalic acid. These reactants may also be copolymerized with other glycols or polyols to modify crystallinity, clarity and various other characteristics or the final resin. For example, 1,4-butanediol and terephthalic acid can be copolymerized with minor amounts of neopentyl glycol or trimethylol propane, as is known in the art. Other suitable systems include block copolymers of PBT and a polyalkylene glycol, such as poly(tetramethylene oxide) and poly(ethylene oxide). The PBT resins may also be blended with other thermoplastic resins, such as polycarbonates and various polyesters to form alloys which are suitable for use as component (A), further described infra. These polymers and interpolymers are well known in the art and further description thereof is considered unnecessary.

Alternatively, thermoplastic resin (A) may be a polyamide resin such as nylon 11, nylon 12, nylon 6, nylon 6/10, nylon 6/12 and nylon 6/6, inter alia. Preferred polyamides of the invention are nylon 12 and nylon 6.

Diorganopolysiloxane (B') is a high consistency (gum) polymer or copolymer which contains at least 2 alkenyl groups having 2 to 20 carbon atoms in its molecule. The alkenyl group is specifically exemplified by vinyl, allyl, butenyl, pentenyl, hexenyl and decenyl. The position of the alkenyl functionality is not critical and it may be bonded at the molecular chain terminals, in non-terminal positions on the molecular chain or at both positions. It is preferred that the alkenyl group is vinyl or hexenyl and that this group is present at a level of 0.001 to 3 weight percent, preferably 0.01 to 1 weight percent, in the diorganopolysiloxane gum.

The remaining (i.e., non-alkenyl) silicon-bonded organic groups in component (B') are independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl, 3-chloropropyl and chloromethyl. It will be understood, or course, that these groups are selected such that the diorganopolysiloxane gum (B') has a glass temperature (or melt point) which is below room temperature and the gum is therefore elastomeric. Methyl preferably makes up at least 85, more preferably at least 90, mole percent of the non-unsaturated silicon-bonded organic groups in component (B').

Thus, polydiorganosiloxane (B') can be a homopolymer, a copolymer or a terpolymer containing such organic groups. Examples include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by straight-chain and partially branched straight-chain, linear structures being preferred.

Specific organopolysiloxanes (B') include: trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and similar copolymers wherein at least one end group is dimethylhydroxysiloxy. Preferred systems for low temperature applications include methylphenylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is about 93%.

Component (B') may also consist of combinations of two or more organopolysiloxanes. Most preferably, component (B') is a polydimethylsiloxane homopolymer which is terminated with a vinyl group at each end of its molecule or is such a homopolymer which also contains at least one vinyl group along its main chain.

For the purposes of the present invention, the molecular weight of the diorganopolysiloxane gum is sufficient to impart a Williams plasticity number of at least about 30 as determined by the American Society for Testing and Materials (ASTM) test method D 926. The plasticity number, as used herein, is defined as the thickness in millimeters×100 of a cylindrical test specimen 2 $cm^3$ in volume and approximately 10 mm in height after the specimen has been subjected to a compressive load of 49 Newtons for three minutes at 25° C. These gums are considerably more viscose than the silicone fluids employed in the prior art. For example, silicones contemplated by Arkles, cited supra, have an upper viscosity limit of 100,000 cS (0.1 $m^2$/s) and, although the plasticity of fluids of such low viscosity are not readily measured by the ASTM D 926 procedure, it was determined that this corresponds to a plasticity of approximately 24. Further, there is no absolute upper limit on the plasticity of component (B'), but practical considerations of processability in conventional mixing equipment generally restrict this value. Preferably, the plasticity number should be about 100 to 200, most preferably about 120 to 185.

Methods for preparing high consistency unsaturated group-containing polydiorganosiloxanes are well known and they do not require a detailed discussion in this specification. For example, a typical method for preparing an alkenyl-functional polymer comprises the base-catalyzed equilibration of cyclic and/or linear diorganopolysiloxanes in the presence of similar alkenyl-functional species.

Component (B") is a fumed silica filler having a specific surface area of at least about 50 m$^2$/gram. The surface area of this filler can be as high as 450 m$^2$/gram but a fumed silica having a surface area of 50 to 400 m$^2$/g, particularly 200 to 380 m$^2$/g, is highly preferred. The filler is preferably treated to render its surface hydrophobic, as typically practiced in the silicone rubber art. This can be accomplished by reacting the silica with a liquid organosilicon compound which contains silanol groups or hydrolyzable precursors of silanol groups. Compounds that can be used as filler treating agents, also referred to as anti-creping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes. It is preferred that the treating compound is an oligomeric hydroxy-terminated diorganopolysiloxane having an average degree of polymerization (DP) of 2 to about 100, more preferably about 2 to about 10, and it is used at a level of about 5 to 50 parts by weight for each 100 parts by weight of the silica filler. When component (B') is the preferred vinyl-functional or hexenyl-functional polydimethylsiloxane, this treating agent is preferably a hydroxy-terminated polydimethylsiloxane used at a level of 5 to 50 parts by weight for each 100 parts by weight of the filler.

Organohydrido silicon compound (C) is a crosslinker (cure agent) for diorganopolysiloxane (B') and is an organopolysiloxane which contains at least 2 silicon-bonded hydrogen atoms in each molecule, but having at least about 0.2 weight percent hydrogen, preferably 0.2 to 2 and most preferably 0.5 to 1.7, percent hydrogen bonded to silicon. Those skilled in the art will, of course, appreciate that either component (B') or component (C), or both, must have a functionality greater than 2 if diorganopolysiloxane (B') is to be cured (i.e., the sum of these functionalities must be greater than 4 on average). The position of the silicon-bonded hydrogen in component (C) is not critical, and it may be bonded at the molecular chain terminals, in non-terminal positions along the molecular chain or at both positions. The silicon-bonded organic groups of component (C) are independently selected from any of the hydrocarbon or halogenated hydrocarbon groups described above in connection with diorganopolysiloxane (B'), including preferred embodiments thereof. The molecular structure of component (C) is also not critical and is exemplified by straight-chain, partially branched straight-chain, branched, cyclic and network structures, linear polymers or copolymers being preferred, this component should be compatible with diorganopolysiloxane (B') (i.e., it is effective in curing the diorganopolysiloxane).

Component (C) is exemplified by the following:
low molecular siloxanes, such as PhSi(OSiMe$_2$H)$_3$;
trimethylsiloxy-endblocked methylhydridopolysiloxanes;
trimethylsiloxy-endblocked dimethylsiloxane-methylhydridosiloxane copolymers;
dimethylhydridosiloxy-endblocked dimethylpolysiloxanes;
dimethylhydrogensiloxy-endblocked methylhydrogenpolysiloxanes;
dimethylhydridosiloxy-endblocked dimethylsiloxane-methylhydridosiloxane copolymers;
cyclic methylhydrogenpolysiloxanes;
cyclic dimethylsiloxane-methylhydridosiloxane copolymers;
tetrakis(dimethylhydrogensiloxy)silane;
silicone resins composed of $(CH_3)_2HSiO_{1/2}$, $(CH_3)_3SiO_{1/2}$, and $SiO_{4/2}$ units; and
silicone resins composed of $(CH_3)_2HSiO_{1/2}$, $(CH_3)_3SiO_{1/2}$, $CH_3SiO_{3/2}$, $PhSiO_{3/2}$ and $SiO_{4/2}$ units,
wherein Me and Ph hereinafter denote methyl and phenyl radicals, respectively.

Particularly preferred organohydrido silicon compounds are polymers or copolymers with RHSiO units ended with either $R_3SiO_{1/2}$ or $HR_2SiO_{1/2}$ units, wherein R is independently selected from alkyl radicals having 1 to 20 carbon atoms, phenyl or trifluoropropyl, preferably methyl. It is also preferred that the viscosity of component (C) is about 0.5 to 1,000 mPa-s at 25° C., preferably 2 to 500 mPa-s. It is highly preferred that component (C) is selected from a polymer consisting essentially of methylhydridosiloxane units or a copolymer consisting essentially of dimethylsiloxane units and methylhydridosiloxane units, having 0.5 to 1.7 percent hydrogen bonded to silicon and having a viscosity of 2 to 500 mPa-s at 25° C. It is understood that such a highly preferred system will have terminal groups selected from trimethylsiloxy or dimethylhydridosiloxy groups.

Component (C) may also be a combination of two or more of the above described systems. The organohydrido silicon compound (C) is preferably used a level such that the molar ratio of SiH therein to Si-alkenyl in component (B') is greater than 1 but below about 50, more preferably 3 to 20, most preferably 6 to 16.

These SiH-functional materials are well known in the art and many of them are commercially available.

Hydrosilation catalyst (D) is a catalyst that accelerates the cure of diorganopolysiloxane (B') in the present composition. This hydrosilation catalyst is exemplified by platinum catalysts, such as platinum black, platinum supported on silica, platinum supported on carbon, chloroplatinic acid, alcohol solutions of chloroplatinic acid, platinum/olefin complexes, platinum/alkenylsiloxane complexes, platinum/beta-diketone complexes, platinum/phosphine complexes and the like; rhodium catalysts, such as rhodium chloride and rhodium chloride/di(n-butyl)sulfide complex and the like; and palladium catalysts, such as palladium on carbon, palladium chloride and the like. Component (D) is preferably a platinum-based catalyst such as chloroplatinic acid; platinum dichloride; platinum tetrachloride; a platinum complex catalyst produced by reacting chloroplatinic acid and divinyltetramethyldisiloxane which is diluted with dimethylvinylsiloxy endblocked polydimethylsiloxane, prepared according to U.S. Pat. No. 3,419,593 to Willing; and a neutralized complex of platinous chloride and divinyltetramethyldisiloxane, prepared according to U.S. Pat. No. 5,175,325 to Brown et al., these patents being hereby incorporated by reference. Most preferably, catalyst (D) is a neutralized complex of platinous chloride and divinyltetramethyldisiloxane.

Component (D) is added to the present composition in a catalytic quantity sufficient to promote the reaction of components (B') and (C) and thereby cure the diorganopolysiloxane. For example, the catalyst is typically added so as to provide about 0.1 to 500 parts per million (ppm) of metal atoms based on the total weight of the thermoplastic composition, preferably 0.25 to 50 ppm.

In addition to the above mentioned major components (A) through (D), a minor amount (i.e., less than about 40 weight percent of the total composition, preferably less than 20 weight percent) of an optional additive (E) can be incorporated in the compositions of the present invention. This optional additive can be illustrated by, but are not limited to, reinforcing fillers for thermoplastics, such as glass fibers and carbon fibers; extending fillers such as quartz, calcium carbonate, and diatomaceous earth; pigments such as iron oxide and titanium oxide, electrically conducting fillers such as carbon black and finely divided metals, flame retardants such as halogenated hydrocarbons, alumina trihydrate, magnesium hydroxide, organophosphorous compounds and other fire retardant (FR) materials. A preferred FR additive is calcium silicate particulate, preferably a wollastonite having an average particle size of 2 to 30 μm. The above additives are typically added to the final thermoplastic composition after dynamic cure, but they may also be added at any point in the preparation provided they do not interfere with the dynamic vulcanization mechanism. It is preferred that a heat stabilizer is added to the thermoplastic resin before mixing the latter with the other components in order to minimize degradation of the thermoplastic. Various heat stabilizers known in the art in connection with the resins of the invention may be used for this purpose and may be illustrated by the class known as hindered phenolic antioxidants which are commercially available under the trade names Irganox™ 1010, Irganox™ 1076, Irganox™ 3114, Irganox™ 1330, Hostanox™ 03 and Cyanox™ 1790, inter alia, a particularly preferred stabilizer being tetrakis (methylene (3,5-di-tert-butyl-4-hydroxy-hydrocinnamate)) methane (Irganox™ 1010). Typically, about 0.05 to 0.5, preferably 0.1 to 0.2, parts by weight of at least one stabilizer is used for each 100 parts by weight of (A). Of course, the above additional ingredients are only used at levels which do not significantly reduce the impact strength of the final composition below desired values and they do not interfere with cure of the diorganopolysiloxane gum.

In a first embodiment of the invention, a thermoplastic composition is prepared by thoroughly dispersing silicone base (B) in a polyester resin and dynamically vulcanizing the diorganopolysiloxane included in the base using organohydrido silicon compound (C) and catalyst (D). Preferably, the polyester is a PBT resin which should be dried prior to mixing with the other components. Drying can be accomplished by heating the resin pellets in an air circulating oven at, e.g., 80° C. to 140° C., preferably at about 120° C., for approximately four hours. In this embodiment, silicone component (B) is a uniform blend of fumed silica (B") and diorganopolysiloxane (B') in a weight ratio of (B") to (B') of 10:90 to 55:45, preferably 15:85 to 40:60 and most preferably 20:80 to 35:65. Silicone base or polyester resin may be added to the mixer first. Mixing may be carried out in any device capable of uniformly dispersing the components in the resin, such as an internal mixer or a twin-screw extruder, the latter being preferred for commercial preparations wherein the temperature is preferably kept as low as practical consistent with good mixing so as not to degrade the resin. Order of mixing is not critical and, for example, components (B'), (B") and, optionally, (C) can be blended separately and then mixed with the resin prior to dynamic vulcanization. However, these components should be well dispersed in the resin before dynamic vulcanization begins. Optimum temperatures, mixing times and other conditions of the mixing operation depend upon the particular resin and other components under consideration and these may be determined by routine experimentation by those skilled in the art.

A preferred mixing procedure comprises first drying resin (A) (e.g., at 120° C. for 4 hours), then melting the resin in an internal mixer under a dry, inert (i.e., non-oxidizing) atmosphere. When the resin has melted, a heat stabilizer is added and mixed in for 2–8 minutes at a controlled temperature which is from 10° C. above the melt point to a temperature just below the degradation temperature of the resin (e.g., for PBT homopolymer, this range is preferably from 230 to 280° C., more preferably 240–265° C.). At this point, base (B) is mixed in to form a uniform blend, typically within 3 to 15 minutes. Generally, the base is previously compounded at room temperature using, e.g., a two-roll mill, as conventionally practiced in the art. To this combination is added the appropriate amount of crosslinker (C) with further mixing for 5 to 10 minutes. Finally, the catalyst (D) is mixed in for an additional 5 to 45 minutes, more typically 10 to 20 minutes, to carry out the dynamic vulcanization.

As noted above, in order for PBT resin alone (i.e., not blended with another resin, as described infra) to be within the scope of the invention, the final TPSiV must have an average notched Izod impact strength of at least 14 foot-pounds per inch (747 J/m), preferably at least 15 ft-lb/in (801 J/m) and most preferably at least 16 ft-lb/in (854 J/m). It has been observed that similar "simple blend" compositions do not exhibit the superior impact strengths. In this context, the term "simple blend" denotes a composition wherein the weight proportions of resin (A), diorganopolysiloxane (B') and filler (B") are identical to the proportions in the dynamically cured composition, but no cure agents are employed (i.e., components (C) and (D) are omitted and the silicone gum is therefore not cured). In order to determine if a particular composition meets the above impact strength criterion, the notched Izod impact strength is measured on a specimen having a length of 62 mm and a width of 3.5 mm and a thickness of 12.7 mm, according to American Society of Testing Materials (ASTM) method D 256-95 (Method A) at room temperature (approximately 25° C.). Briefly, this test measures the amount of energy required to break a notched specimen by a swinging pendulum hammer. Since such samples can develop heterogeneity (e.g., bubbles) during the molding process, for the purposes herein, at least 7 samples are tested and the best 3 values averaged and reported as energy absorbed per unit width. Typically, PBT samples having an average impact energy of at least about 320 J/m exhibit only "hinge" or "partial" breaks while "complete" breaks are only observed for samples having an energy of 260 J/m or less.

The weight ratio of silicone base (B) to polyester resin can range from 10:90 to 35:65, preferably 15:85 to 30:70, most preferably 18:82 to 25:75. For the preferred PBT resins, these proportions should be consistent with the above recited impact strength requirement of at least 747 J/m. However, it has been found that for PBT resin these requirements are only met at the extremes of the above range when the silica content of base (B) is near its upper limit. That is, the above extreme proportions of component (B) and PBT will result in a composition having an average Izod value of at least 747 J/m when the ratio of silica (B") to diorganopolysiloxane (B') is, e.g., 40:60. Lower values of the (B")/(B') ratio would require a narrower range of the above (B)/(A) ratio, this being determined by routine experimentation. Preferably, the latter ratio is 18:82 to 25:75.

In a second embodiment of the present invention, resin (A) is a blend of 95 to 70 weight percent of a preferably pre-dried poly(butylene terephthalate) resin as described in connection with the first embodiment and 5 to 30 weight percent of a preferably pre-dried polycarbonate (PC) resin. The latter thermoplastics are well known in the art and are preferably aromatic polymers such as poly(bisphenol A carbonate). Preferably, the PC content of component (A) in this embodiment of the invention is 10 to 30, more preferably 20 to 30 weight percent. Under these circumstances, the above mentioned impact resistance of 747 J/m can be achieved without the need for silica filler when the weight ratio of the diorganopolysiloxane (B') to thermoplastic resin (A) is 10:90 to 35:65. It is contemplated that in this embodiment the resin blend optionally contains up to 55% of silica filler (B") based on the total weight of said silicone component (B), but this filler is not required in order to obtain high impact values. As in systems of the first embodiment which must include fumed silica, the exact proportions of (B') and (A) needed to obtain the high impact strength are determined by routine experimentation, a greater amount of the diorganopolysiloxane generally being needed when the PC content is at the lower end of the above recited range. Preferably, the weight ratio of (B') to (A) is 10:90 to 35:65, more preferably 18:72 to 25:75. As before, the mixing is preferably carried out under an inert, dry atmosphere and the order of mixing is again not critical as long as addition of catalyst and dynamic vulcanization of the silicone gum component is the final step.

In a third embodiment of the present invention, resin (A) is a polyamide resin or a blend of two or more such resins, as described supra. The silicone base (B) is the above described blend of diorganopolysiloxane gum (B') and fumed silica (B") of the first embodiment and the weight ratio of base (B) to the polyamide can range from 10:90 to 35:65, preferably 15:85 to 30:70, most preferably 18:82 to 25:75. In this embodiment, the resin is preferably dried and the mixing carried out under a dry, inert atmosphere such as nitrogen. It is preferred that the resin is first melted at a temperature as low as possible consistent with good mixing and the base is mixed in, followed by the crosslinker and catalyst to complete dynamic vulcanization of the gum. It is also preferred that a heat stabilizer, as described above, is employed at the above mentioned proportions.

The employ of a masterbatch mixing technique is also contemplated in each of the above described embodiments. In this variation of the instant method, a TPSiV having a high weight ratio of silicone base (or, in the case of the second embodiment, only diorganopolysiloxane gum) to resin (e.g., 70:30 to 50:50) is first prepared and this masterbatch composition is subsequently diluted with additional resin to bring this ratio into the range of 10:90 to 35:65. Of course, any composition based on only PBT resin, whether prepared by a direct route or by the above described dilution technique, must exhibit the minimum average Izod impact value recited supra in order to be within the scope of the first embodiment of the invention.

In addition to the above three preferred embodiments, it is contemplated that other thermoplastic resins can be modified with silicone gum or base in order to increase impact strength thereof according to the above described methods. Suitable resins include polyketones, such as polyetherketone (PEK), poly(ether)ether ketone (PEEK) and CARILON™; aromatic polyethers, such as poly(phenylene ether) and Noryl™; polysulphides such as poly(phenylene sulfide) (PPS); polysulphones such as polyethersulfone (PES); and polyacetals, such as poly(oxymethylene) (POM). The key parameters which determine the degree of impact improvement of a given system include:

1. Particle size of the dispersed silicone rubber particles;
2. Silicone rubber concentration;
3. Distance between particles; and
4. Interfacial adhesion between the particles and the polymer matrix.

The thermoplastic compositions prepared by the above described method can be processed by conventional techniques, such as extrusion, injection molding or compression molding, to fabricate plastic parts. Moreover, these compositions can be re-processed (recycled) with little or no degradation of mechanical properties.

The novel thermoplastic compositions of the present invention find utility in the fabrication of parts for automotive, electrical, electronic, mechanical, lighting, household appliance, business machine and medical equipment applications.

EXAMPLES

The following examples are presented to further illustrate the compositions of this invention, but are not to be construed as limiting the invention, which is delineated in the appended claims. All parts and percentages in the examples are on a weight basis and all measurements were obtained at room temperature (approximately 25° C.) unless indicated to the contrary.

The following materials, listed alphabetically for ease of reference, were employed in the examples. PBT and PC resins were dried for 4 hours at 120° C. before mixing with other components.

BASE 1 is a silicone rubber base made from 68.7% PDMS 1, defined infra, 25.8% of a fumed silica having a surface area of about 250 $m^2/g$, 5.4% of a hydroxy-terminated diorganopolysiloxane having an average degree of polymerization (DP) of about 4 and 0.02% of ammonium carbonate.

BASE 2 is a silicone rubber base made from 76.6% PDMS 1, defined infra, 17.6% of a fumed silica having a surface area of about 250 $m^2/g$, 5.7% of a hydroxy-terminated diorganopolysiloxane having an average degree of polymerization (DP) of about 4 and 0.02% of ammonium carbonate.

BASE 3 is a silicone rubber base made from 53.8% PDMS 1, defined infra, 35.5% of a fumed silica having a surface area of about 250 $m^2/g$, 10.8% of a hydroxy-terminated diorganopolysiloxane having an average degree of polymerization (DP) of about 4 and 0.02% of ammonium carbonate.

BASE 4 is a uniform blend of 74% of PDMS 2, described infra, and 26% of a precipitated silica, Supernat™ 44 obtained from Degussa Corp., Ridgefield Park, N.J.

BASE 5 is a uniform blend of 74% of PDMS 2, described infra, and 26 parts of MIN-U-SIL™ (5 micron), the latter filler being described as a non-reinforcing ground silica having a top particle size of 5 micrometers, marketed by U. S. Silica Co., Berkeley Springs, W.Va.

BASE 6 is a uniform blend of 74% of PDMS 2, described infra, and 26% of Supermite™, the latter being described as an untreated calcium carbonate powder silica having an average particle size of about 1 micrometer, obtained from ECC America, Inc., Sylacauga, Ala.

CATALYST 1 is a 0.62 % platinum complex of 1,3-diethenyl-1,1,3,3-tetramethyldisiloxane; 7.4% tetramethyldivinyldisiloxane; 92% dimethylvinyl ended polydimethylsiloxane and 0.6% dimethylcyclopolysiloxanes having 6 or greater dimethylsiloxane units.

COMPATIBILIZER is a silicone-polyamide copolymer prepared by first reacting 1012.5 g of undecylenic acid, and 450.0 g of a 70% hexamethylene diamine mixture in water at 225° C. /2 hours under nitrogen. Unreacted materials were removed under vacuum and the reaction product was heated to 120° C. To 100 g of the above product, there was added 65 g of toluene, 0.5 g of CATALYST 1 and 740.8 g of a dimethylhydrogenendblocked polydimethylsiloxane having an average degree of polymerization (DP) of 45, the latter being added from an addition funnel over a 30 minute period and hydrosilation was carried out at 115° C. After complete addition, the addition funnel was replaced with a Dean-Stark trap and the toluene removed. After removal of the toluene, the materials were allowed to react for an additional one hour. Vacuum stripping was applied to the flask for 1 hour to ensure complete removal of any residual solvent. Irganox™ 1010 is a heat stabilizer described as tetrakis (methylene (3,5-di-tert-butyl-4-hydroxy-hydrocinnamate)) methane and marketed by Ciba-Geigy (Additives Division, Hawthorne, N.Y.

NYLON 12 is a polylauryllactam nylon 12, obtained from Aldrich Chemical Company, Milwaukee, Wis.

PBT 1 is Valox™ 315, a poly(butylene terephthalate) resin having a melt point of 227° C. and marketed by GE Plastics, Mount Vernon, Ind.

PC is Lexan™ 141-111, described as a polycarbonate resin and marketed by GE Plastics. PDMS 1 is a gum consisting of 99.6 wt % $Me_2SiO$ units, 0.16% MeViSiO units and 0.17% $Me_2ViSiO_{1/2}$ units, wherein Me and Vi hereinafter represent methyl and vinyl group, respectively. Prepared by potassium catalyzed equilibration of cyclic siloxanes wherein the catalyst is neutralized with carbon dioxide. This gum has plasticity of about 150.

PDMS 2 is a gum similar to PDMS 1 wherein the equilibration catalyst is neutralized with 0.04% carbon dioxide and 0.011% of bis(dimethylvinyl silyl) vinylphosphonate, according to the method of U.S. Pat. No. 5,481,014 to Graiver et al.

SILICA is a fumed silica filler having a surface area of about 250 $m^2/g$ and marketed under the trade name of Cab-O-Sil® MS-75 by Cabot Corp., Tuscola, Ill.

X-LINKER is an SiH-functional crosslinker consisting essentially of 65.6% MeHSiO units, 32.3% $Me_2SiO$ units and 1.8% $Me_3SiO_{1/2}$ units.

Examples 1–8

A toughened composition of the invention was prepared by the following procedure. PBT 1 (160 g) was first dried at 120° C. for four hours. Then it was melted at 245° C./60 rpm in a Haake™ System 9000 bowl mixer (45 rpm for Examples 2, 3 and 5) under a nitrogen atmosphere. Subsequently, 0.24 g of Irganox™ 1010 was added and mixed in for 100 seconds. The system was mixed with a BASE 1 (40 g) and, after about 8 minutes, mixing torque increased to about 2,000 m-g. X-LINKER (0.9 g) was then added and the torque continued to rise to about 2,350 m-g. CATALYST 1 (8 drops=0.13 g) was added and the torque jumped to 5,000 m-g, indicating vulcanization of the silicone rubber phase. The material appeared to be a uniform melt. Mixing was continued for another 18 minutes, whereupon the composition was removed to provide a tough, white plastic upon cooling.

A sample of the above material was again dried at 120° C. for four hours and compression molded at 260° C. for 2 min at approximately 2,500 psi in a stainless steel mold followed by cold pressing at room temperature. Notched Impact Strength (IZOD) was determined by American Society of Testing Materials (ASTM) method D 256-95 at 23° C., the average impact strength (average of best 3 out of at least 7 specimens) being 16.7 ft-lb/in (894 J/m), as shown in Table 1 (Example 1). This represents a 17 fold improvement over a similar unmodified PBT control having a corresponding impact value of 0.86 ft-lb/in (46 J/m).

Similar compositions were prepared using the bases shown in Table 1 which, in addition to reporting the Izod impact values, also indicates the percent of the base used (relative to total base+resin) and the flexural modulus of the resulting molded composition according to ASTM method D 790.

TABLE 1

| Example | Silicone Type | Silicone Base Content (%) | Impact Strength (J/m) | Flex Modulus (MPa) |
|---------|---------------|---------------------------|-----------------------|--------------------|
| 1  | BASE 1 | 20 | 894 | 1.44 |
| 2* | BASE 1 | 23 | 906 | 1.244 |
| 3* | BASE 1 | 25 | 903 | 0.993 |
| 4  | BASE 2 | 20 | 819 | 1.41 |
| 5* | BASE 2 | 25 | 757 | — |
| 6  | BASE 3 | 15 | 866 | 1.806 |
| 7  | BASE 3 | 20 | 949 | 1.501 |
| 8  | BASE 3 | 25 | 884 | 1.28 |

*mixing was done at 45 rpm instead of 60 rpm.

(Comparative) Examples 9–19

The methods of Example 1 were followed wherein either PDMS 2 gum or one of the filled silicone bases was dispersed in PBT 1 and dynamically vulcanized therein. The type of silicone component employed, its content (based on the total weight of silicone and PBT 1), the average Izod impact resistance and the flexural modulus are indicated in Table 2, wherein Example 19 served as a control (i.e., neat PBT resin).

TABLE 2

| (Comparative) Example | Silicone Type | Silicone Content (%) | Impact Strength (J/m) | Flex Modulus (MPa) |
|-----------------------|---------------|----------------------|-----------------------|--------------------|
| 9  | BASE 1 | 10 | 161 | — |
| 10 | BASE 1 | 15 | 604 | 1.74 |
| 11 | BASE 1 | 30 | 743 | 0.98 |
| 12 | BASE 2 | 10 | 183 | 2.026 |
| 13 | BASE 2 | 15 | 162 | — |
| 14 | BASE 2 | 30 | 583 | 0.97 |
| 15 | PDMS 2 | 10 | 166 | 1.855 |
| 16 | PDMS 2 | 20 | 699 | 1.38 |
| 17 | PDMS 2 | 25 | 677 | — |
| 18 | PDMS 2 | 30 | 557 | 0.89 |
| 19 | None   | 0  | 46  | 2.14 |

It is seen from Table 2 that the above comparative compositions have average Izod impact strengths below 14 ft-lb/in (747 J/m).

(Comparative) Examples 20–22

The methods of Example 1 were followed wherein the bases shown in Table 3 dispersed in PBT 1 and dynamically vulcanized therein. The type of silicone base employed, its content (relative to base plus PBT 1) and the average Izod impact resistance are indicated in Table 3.

TABLE 3

| (Comparative) Example | Silicone Type | Silicone Base Content (%) | Impact Strength (J/m) |
|-----------------------|---------------|---------------------------|-----------------------|
| 20 | BASE 4 | 20 | 573 |
| 21 | BASE 5 | 20 | 574 |
| 22 | BASE 6 | 20 | 629 |

It can be seen from Table 3 that the compositions which employ fillers other than the fumed silica of the invention did not provide an impact strength of at least 747 J/m.

Example 23

A composition of the invention was prepared by melting pre-dried (see Example 1) PBT 1 (128 g) at 245° C., 45 rpm in a Haake™ System 9000 bowl mixer under a nitrogen atmosphere. Irganox 1010 (0.19 g) was added and mixed in for 6 minutes followed by PC (32 g), the latter being mixed in for 5 minutes. This combination was mixed with a BASE 1 (40 g) for about 5 minutes, as the torque increased to about 1,500 m-g. X-LINKER (0.9 g) was then added and the torque continued to rise to about 1,700 m-g. CATALYST 1 (8 drops=0.13 g) was added and the torque jumped to 5,600 m-g, indicating vulcanization of the silicone rubber phase. The material appeared to be a uniform melt. Mixing was continued for another 16 minutes and the contents were removed from the mixer to yield a tough, white plastic upon cooling. This was dried, molded and tested as described above and had an average impact strength of 18.2 ft-lb/in (970 J/m) (average of best 3 specimens).

Example 24

A toughened composition of the invention was prepared by the following procedure. Pre-dried (120° C./4 hours) PBT 1 (128 g) was melted at 245° C., as described above, and Irganox™ 1010 (0.19 g) was mixed in for 5 minutes. PC (32 g) was then mixed in for 5 minutes followed by PDMS 2 (40 g), the latter being mixed in for about 6 minutes. Torque increased to about 1,600 m-g and X-LINKER (1.2 g) was added as the torque continued to rise to about 1,750 m-g. CATALYST 1 (11 drops=0.18 g) was added and the torque jumped to 8,000 m-g, indicating vulcanization of the silicone phase. The material appeared to be a uniform melt. This combination was mixed for another 16 minutes and then removed from the mixer to yield a tough, white plastic upon cooling. This was dried, molded and tested as described above and had an average impact strength of 15.6 ft-lb/in (831 J/m) (average of best 3 specimens). [check this****]

Example 25

The procedure of Example 1 was repeated except the Irganox™ 1010 was omitted. The resulting material had an impact strength of 15.75 ft-lb/in (841 J/m) (average of best 3 specimens).

Example 26

The procedure of Example 25 was repeated except that the order of addition was reversed (i.e., first BASE 1 was added, then PBT 1, crosslinker and finally catalyst). The resulting material had an impact strength of 15.34 (819 J/m) (average of best 3 specimens).

Example 27

Three 200 gram batches of a silicone rubber-modified polyamide composition were prepared as follows. NYLON 12 was first dried at 120° C. for 2 hours and 160 g thereof was melted and mixed in a Haake™ PolyLab System Mixer at 210° C./60 rpm for 5–10 minutes under a nitrogen atmosphere. Irganox 1010 (2.0 g) was added and blended for 2–3 minutes (batch-to-batch variation) prior to adding 40 g of BASE 1, the latter being blended in for an additional 3 minutes. COMPATIBILIZER 1 (1.0 g) was added and mixed for 3 minutes prior to adding 1.27 g of X-LINKER which was also blended in for 3 minutes. CATALYST 1 (0.28 g=17 drops) was added and, after 2–3 minutes, torque increased 500–600 m-g to a maximum of 1500–1600 m-g (batch-to-batch variation). The three batches were then dried as described above, blended together in a Nelmor™ pelletizing machine and injection molded at 210° C. (nozzle)/140° C. (mold).

Notched impact strength (IZOD) was determined at 23° C., the average value (best 3 specimens out of 10) being 14.6 ft-lb/in (778 J/m). This represents a 15.9 fold increase over a similar unmodified NYLON 12 control which exhibited an average value of only 0.914 ft-lb/in (48.8 J/m) (average of best 3 specimens).

Example 28

Three 200 gram batches of a silicone rubber-modified, undried polyamide composition were prepared as follows. BASE 1 (40 g) was mixed for 3–5 minutes under a nitrogen atmosphere as in Example 27 and 160.0 g of NYLON 12 was added and mixed in for 10–12 minutes (batch-to-batch variation). X-LINKER (1.27 g) was added and allowed to blend for an additional 3 minutes. A blend (1.4 g) of CATALYST 1 diluted in a 1,000 cS polydimethylsiloxane fluid in a 1:4 ratio was mixed in for 10 minutes, at which point the torque increased 500 m-g to a maximum value of 1400–1500 m-g (batch-to-batch variation). The three batches were then blended together, injection molded and tested, as described in Example 27.

Notched impact strength (IZOD) was determined at 23° C., the average value (best 3 specimens out of 10) being 11.7 ft-lb/in (626 J/m). This represents a 12.6 fold increase over a similar undried, unmodified NYLON 12 control which exhibited an average value of only 0.93 ft-lb/in (49.6 J/m).

(Comparative) Example 29

Preparation of a toughened polyketone composition was attempted according to the above procedure. Fifty grams of BASE 1 was mixed for 2 minutes at 250° C., 60 rpm in a Haake™ 9000 System under a nitrogen atmosphere. Polyketone (200 grams of Shell Chemical's Carilon™ D26HM700) was then mixed in for 5 minutes to obtain a uniform blend. X-LINKER (0.94 g ) was added and mixed for 3 minutes. Finally, 0.47 g of a blend of CATALYST 1 diluted in a 1,000 cS polydimethylsiloxane fluid (in a 1:4 ratio) was mixed in for an additional 2.5 minutes. There was no observed increase in mixing torque during any portion of this run. The final blend showed some separation of the silicone (i.e., poor mixing).

Three batches of the above described material were blended together, pelletized and injection molded at 250° C. (barrel)/79° C. (mold) to prepare test specimens. Notched Impact Strength (IZOD) was 3.76 ft-lb/in (201 J/m). A similar unmodified Polyketone control had impact strength of 4.07 ft-lb/in (217 J/m) (average of best 3 specimens).

(Comparative) Example 30

Preparation of a toughened polyacetal composition was attempted according to the above procedure. A polyoxymethylene resin (Dupont's Delrin™ 500P; 160 grams) was melted at 200° C., 100 rpm in a Haake™ Polylab System under a nitrogen atmosphere. Subsequently, 40 grams of BASE 1 was added and mixed for 4 minutes. X-LINKER (1.5 g) was added and mixed for 4 minutes, at which time the mixer torque dropped to 800 m-g. A blend of CATALYST 1 diluted in a polydimethylsiloxane fluid (in a 1:4 ratio) (0.75 g) was mixed in for another 4 minutes, at which time torque increased to 1500 m-g. The material appeared to be a uniform melt and it was removed from the mixer and allowed to cool.

Three 200 gram batches of the above described material were blended together, pelletized and injection molded at 200° C. (barrel)/60° C. (mold) to provide test specimens.

Notched Impact Strength (IZOD) was 0.796 ft-lb/in (42.5 J/m). A similar unmodified Delrin™ 500P control had impact strength of 1.28 ft-lb/in (68.3 J/m) (average of best 3 specimens).

The above two comparative examples indicate that particle size of the silicone rubber was too large (i.e., greater than about 3 microns) and therefore the impact resistance was not increased over the neat resin.

That which is claimed is:

1. A thermoplastic composition prepared by
   (I) mixing components (A), (B), (C) and (D) and
   (II) dynamically curing component (B), wherein the weight ratio of component (B) to component (A) in said thermoplastic composition is 10:90 to 35:65, and wherein
      (A) is a thermoplastic resin selected from a poly(butylene terephthalate) resin, a blend of said poly(butylene terephthalate) resin and a polycarbonate resin, a polyester other than said poly(butylene terephthalate) resin or a polyamide resin;
      (B) is a silicone component comprising
         (i) a diorganopolysiloxane gum having a plasticity of at least 30 and having an average of at least 2 alkenyl radicals in its molecule and
         (ii) a fumed silica filler, the weight ratio of said filler to said diorganopolysiloxane being 10:90 to 55:45,
   with the proviso that said fumed silica filler is optional when (A) is said blend of poly(butylene terephthalate) resin and polycarbonate resin;
      (C) is an organohydrido silicon compound which contains an average of at least 2 silicon-bonded hydrogen groups in its molecule; and
      (D) is a hydrosilation catalyst, components (C) and (D) being present in an amount sufficient to cure said diorganopolysiloxane,
   with the proviso that when (A) is said poly(butylene terephthalate) resin said thermoplastic composition has an Izod impact strength of at least 747 J/m.

2. A thermoplastic composition prepared by
   (I) mixing
      (A) a poly(butylene terephthalate) resin,
      (B) a silicone rubber base comprising
         (B') a diorganopolysiloxane gum having a plasticity of at least 30 and having an average of at least 2 alkenyl radicals in its molecule and
         (B") a fumed silica filler, the weight ratio of (B") to (B') being 10:90 to 55:45,
      (C) an organohydrido silicon compound which contains an average of at least 2 silicon-bonded hydrogen groups in its molecule, and
      (D) a hydrosilation catalyst, components (C) and (D) being present in an amount sufficient to cure said diorganopolysiloxane; and
   (II) dynamically curing said diorganopolysiloxane gum, wherein the weight ratio of said silicone base to said resin in said thermoplastic composition is 10:90 to 35:65 and said thermoplastic composition has an Izod impact strength of at least 747 J/m.

3. The composition according to claim 2, further comprising a heat stabilizer, wherein the weight ratio of said filler to said diorganopolysiloxane gum is 15:85 to 40:60.

4. The composition according to claim 3, wherein said diorganopolysiloxane is a gum selected from the group consisting of a copolymer of dimethylsiloxane units and methylvinylsiloxane units and a copolymer of dimethylsiloxane units and methylhexenylsiloxane units.

5. The composition according to claim 4, wherein said organohydrido silicon component (C) is selected from the group consisting of a polymer consisting essentially of methylhydridosiloxane units and a copolymer consisting essentially of dimethylsiloxane units and methylhydridosiloxane units, having 0.5 to 1.7 weight percent hydrogen bonded to silicon.

6. The composition according to claim 5, wherein said catalyst (D) is a neutralized complex of platinous chloride and divinyltetramethyldisiloxane.

7. The composition according to claim 2, wherein the weight ratio of said silicone base to said poly(butylene terephthalate) resin is 18:82 to 25:75.

8. The composition according to claim 3, wherein the weight ratio of said silicone base to said poly(butylene terephthalate) resin is 18:82 to 25:75.

9. The composition according to claim 4, wherein the weight ratio of said silicone base to said poly(butylene terephthalate) resin is 18:82 to 25:75.

10. A thermoplastic composition prepared by
    (I) mixing
       (A) a blend of 95 to 60 weight percent of a poly(butylene terephthalate) resin and 5 to 40 weight percent of a polycarbonate resin,
       (B) a diorganopolysiloxane gum having a plasticity of at least 30 and having an average of at least 2 alkenyl radicals in its molecule
       (C) an organohydrido silicon compound which contains an average of at least 2 silicon-bonded hydrogen groups in its molecule, and
       (D) a hydrosilation catalyst, components (C) and (D) being present in an amount sufficient to cure said diorganopolysiloxane; and
    (II) dynamically curing said diorganopolysiloxane gum, wherein the weight ratio of (B) to (A) in said thermoplastic composition is 10:90 to 35:65.

11. The composition according to claim 10, further comprising a heat stabilizer.

12. The composition according to claim 11, wherein said diorganopolysiloxane is a gum selected from the group consisting of a copolymer of dimethylsiloxane units and methylvinylsiloxane units and a copolymer of dimethylsiloxane units and methylhexenylsiloxane units.

13. The composition according to claim 12, wherein said organohydrido silicon component (C) is selected from the group consisting of a polymer consisting essentially of methylhydridosiloxane units and a copolymer consisting essentially of dimethylsiloxane units and methylhydridosiloxane units, having 0.5 to 1.7 weight percent hydrogen bonded to silicon.

14. The composition according to claim 13, wherein said catalyst (D) is a neutralized complex of platinous chloride and divinyltetramethyldisiloxane.

15. The composition according to claim 10, wherein the weight ratio of said diorganopolysiloxane gum to said blend (A) is 18:82 to 25:75.

16. The composition according to claim 11, wherein the weight ratio of said diorganopolysiloxane gum to said blend (A) is 18:82 to 25:75.

17. The composition according to claim 12, wherein the weight ratio of said diorganopolysiloxane gum to said blend (A) is 18:82 to 25:75.

18. A thermoplastic composition prepared by
    (I) mixing
       (A) a polyamide resin,
       (B) a silicone rubber base comprising
          (B') a diorganopolysiloxane gum having a plasticity of at least 30 and having an average of at least 2 alkenyl radicals in its molecule and (B") a fumed silica filler, the weight ratio of (B") to (B') being 10:90 to 55:45, (C) an organohydrido silicon compound which contains an average of at least 2 silicon-bonded hydrogen groups in its molecule, and (D) a hydrosilation catalyst, components (C) and (D) being present in an amount sufficient to cure said diorganopolysiloxane; and (II) dynamically curing said diorganopolysiloxane gum, wherein the weight ratio of said silicone base to said resin in said thermoplastic composition is 10:90 to 35:65.

19. The composition according to claim 18, further comprising a heat stabilizer.

20. The composition according to claim 19, wherein said diorganopolysiloxane is a gum selected from the group consisting of a copolymer of dimethylsiloxane units and methylvinylsiloxane units and a copolymer of dimethylsiloxane units and methylhexenylsiloxane units.

21. The composition according to claim 20, wherein said organohydrido silicon component (C) is selected from the group consisting of a polymer consisting essentially of methylhydridosiloxane units and a copolymer consisting essentially of dimethylsiloxane units and methylhydridosiloxane units, having 0.5 to 1.7 weight percent hydrogen bonded to silicon.

22. The composition according to claim 21, wherein said catalyst (B) is a neutralized complex of platinous chloride and divinyltetramethyldisiloxane.

23. The composition according to claim 18, wherein the weight ratio of said diorganopolysiloxane gum to said polyamide resin (A) is 18:82 to 25:75.

24. The composition according to claim 19, wherein the weight ratio of said diorganopolysiloxane gum to said polyamide resin (A) is 18:82 to 25:75.

25. The composition according to claim 20, wherein the weight ratio of said diorganopolysiloxane gum to said polyamide resin (A) is 18:82 to 25:75.

26. The composition according to claim 18, wherein said polyamide resin is selected from nylon 12 or nylon 6.

27. The composition according to claim 19, wherein said polyamide resin is selected from nylon 12 or nylon 6.

28. The composition according to claim 20, wherein said polyamide resin is selected from nylon 12 or nylon 6.

29. The composition according to claim 1, further comprising a calcium silicate particulate.

30. The composition according to claim 2, further comprising a calcium silicate particulate.

31. The composition according to claim 10, further comprising a calcium silicate particulate.

32. The composition according to claim 18, further comprising a calcium silicate particular.

* * * * *